United States Patent
Teh et al.

(10) Patent No.: US 8,699,185 B1
(45) Date of Patent: Apr. 15, 2014

(54) DISK DRIVE DEFINING GUARD BANDS TO SUPPORT ZONE SEQUENTIALITY WHEN BUTTERFLY WRITING SHINGLED DATA TRACKS

(71) Applicant: Western Digital Technologies, Inc., Irvine, CA (US)

(72) Inventors: Joo Peng Teh, Kuala Lumpur (MY); James N. Malina, Irvine, CA (US); Joe C. Lee, Fullerton, CA (US); Muhammad Nur Syukri Ahmad Shukor, Karak (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/709,470

(22) Filed: Dec. 10, 2012

(51) Int. Cl.
*G11B 5/82* (2006.01)

(52) U.S. Cl.
USPC .......................................................... 360/135

(58) Field of Classification Search
None
See application file for complete search history.

(56) References Cited

U.S. PATENT DOCUMENTS

| | | |
|---|---|---|
| 4,769,770 A | 9/1988 | Miyadera et al. |
| 4,992,936 A | 2/1991 | Katada et al. |
| 5,121,480 A | 6/1992 | Bonke et al. |
| 5,293,282 A | 3/1994 | Squires et al. |
| 5,613,066 A | 3/1997 | Matsushima et al. |
| 5,983,309 A | 11/1999 | Atsatt et al. |
| 6,092,231 A | 7/2000 | Sze |
| 6,105,104 A | 8/2000 | Guttmann et al. |
| 6,182,250 B1 | 1/2001 | Ng et al. |
| 6,182,550 B1 | 2/2001 | Brewington et al. |
| 6,202,121 B1 | 3/2001 | Walsh et al. |
| 6,240,501 B1 | 5/2001 | Hagersten |
| 6,324,604 B1 | 11/2001 | Don et al. |
| 6,339,811 B1 | 1/2002 | Gaertner et al. |
| 6,411,454 B1 | 6/2002 | Monroe, III |
| 6,556,365 B2 | 4/2003 | Satoh |
| 6,574,774 B1 | 6/2003 | Vasiliev |
| 6,636,049 B1 | 10/2003 | Lim et al. |
| 6,690,538 B1 | 2/2004 | Saito et al. |
| 6,728,054 B2 | 4/2004 | Chng et al. |
| 6,735,032 B2 | 5/2004 | Dunn et al. |
| 6,772,274 B1 | 8/2004 | Estakhri |

(Continued)

FOREIGN PATENT DOCUMENTS

WO 2009/102425 8/2009

OTHER PUBLICATIONS

Definition of adjacent, Merriam-Webster Dictionary, retrieved from http://www.merriam-webster.com/dictionary/adjacent on Oct. 30, 2013 (1 page).

(Continued)

*Primary Examiner* — Paul Huber

(57) ABSTRACT

A disk drive is disclosed wherein a plurality of zones are defined on first and second disk surfaces, wherein each zone comprises a plurality of data tracks. Data is written to the data tracks of a first plurality of the zones on the first and second disk surfaces in an interleaved manner, in a first radial direction, and in a shingled manner. Data is written to the data tracks of a second plurality of the zones on the first and second disk surfaces in an interleaved manner, in a second radial direction opposite the first radial direction, and in a shingled manner. At least one guard band is defined at a boundary between a first zone and a second zone in the second plurality of zones on the first disk surface, wherein the guard band comprises at least one unused data track.

18 Claims, 4 Drawing Sheets

(56) References Cited

U.S. PATENT DOCUMENTS

| | | |
|---|---|---|
| 6,829,688 B2 | 12/2004 | Grubbs et al. |
| 6,886,068 B2 | 4/2005 | Tomita |
| 6,895,468 B2 | 5/2005 | Rege et al. |
| 6,901,479 B2 | 5/2005 | Tomita |
| 6,920,455 B1 | 7/2005 | Weschler |
| 6,956,710 B2 | 10/2005 | Yun et al. |
| 6,967,810 B2 | 11/2005 | Kasiraj et al. |
| 6,980,386 B2 | 12/2005 | Wach et al. |
| 6,992,852 B1 | 1/2006 | Ying et al. |
| 7,012,771 B1 | 3/2006 | Asgari et al. |
| 7,035,961 B2 | 4/2006 | Edgar et al. |
| 7,046,471 B2 | 5/2006 | Meyer et al. |
| 7,076,391 B1 | 7/2006 | Pakzad et al. |
| 7,082,007 B2 | 7/2006 | Liu et al. |
| 7,089,355 B2 | 8/2006 | Auerbach et al. |
| 7,113,358 B2 | 9/2006 | Zayas et al. |
| 7,120,726 B2 | 10/2006 | Chen et al. |
| 7,155,448 B2 | 12/2006 | Winter |
| 7,199,981 B2 | 4/2007 | Zabtcioglu |
| 7,254,671 B2 | 8/2007 | Haswell |
| 7,283,316 B2 | 10/2007 | Chiao et al. |
| 7,298,568 B2 | 11/2007 | Ehrlich et al. |
| 7,330,323 B1 | 2/2008 | Singh et al. |
| 7,343,517 B2 | 3/2008 | Miller et al. |
| 7,408,731 B2 | 8/2008 | Uemura et al. |
| 7,412,585 B2 | 8/2008 | Uemura |
| 7,436,610 B1 | 10/2008 | Thelin |
| 7,436,614 B2 | 10/2008 | Uchida |
| 7,440,224 B2 | 10/2008 | Ehrlich et al. |
| 7,486,460 B2 | 2/2009 | Tsuchinaga et al. |
| 7,490,212 B2 | 2/2009 | Kasiraj et al. |
| 7,509,471 B2 | 3/2009 | Gorobets |
| 7,516,267 B2 | 4/2009 | Coulson et al. |
| 7,529,880 B2 | 5/2009 | Chung et al. |
| 7,539,924 B1 | 5/2009 | Vasquez et al. |
| 7,603,530 B1 | 10/2009 | Liikanen et al. |
| 7,647,544 B1 | 1/2010 | Masiewicz |
| 7,669,044 B2 | 2/2010 | Fitzgerald et al. |
| 7,685,360 B1 | 3/2010 | Brunnett et al. |
| 7,840,878 B1 | 11/2010 | Tang et al. |
| 7,860,836 B1 | 12/2010 | Natanzon et al. |
| 7,885,921 B2 | 2/2011 | Mahar et al. |
| 7,900,037 B1 | 3/2011 | Fallone et al. |
| 7,982,993 B1 | 7/2011 | Tsai et al. |
| 8,006,027 B1 | 8/2011 | Stevens et al. |
| 8,031,423 B1 | 10/2011 | Tsai et al. |
| 8,116,020 B1 | 2/2012 | Lee |
| 8,179,627 B2 | 5/2012 | Chang et al. |
| 8,194,340 B1 | 6/2012 | Boyle et al. |
| 8,194,341 B1 | 6/2012 | Boyle |
| 8,341,339 B1 | 12/2012 | Boyle et al. |
| 8,443,167 B1 | 5/2013 | Fallone et al. |
| 8,560,759 B1 | 10/2013 | Boyle et al. |
| 2001/0042166 A1 | 11/2001 | Wilson et al. |
| 2003/0065872 A1 | 4/2003 | Edgar et al. |
| 2003/0220943 A1 | 11/2003 | Curran et al. |
| 2004/0019718 A1 | 1/2004 | Schauer et al. |
| 2004/0109376 A1 | 6/2004 | Lin |
| 2005/0069298 A1 | 3/2005 | Kasiraj et al. |
| 2005/0071537 A1 | 3/2005 | New et al. |
| 2005/0138265 A1 | 6/2005 | Nguyen et al. |
| 2005/0144517 A1 | 6/2005 | Zayas |
| 2005/0157416 A1 | 7/2005 | Ehrlich et al. |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0174582 A1 | 7/2007 | Feldman |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |
| 2009/0063548 A1 | 3/2009 | Rusher et al. |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0271581 A1 | 10/2009 | Hinrichs, Jr. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |
| 2011/0167049 A1 | 7/2011 | Ron |
| 2011/0304935 A1 | 12/2011 | Chang et al. |

OTHER PUBLICATIONS

RE:Hard drive Inner or Outer tracks???, Matthias99, Apr. 12, 2004, retrieved from http://forums.anandtech.com/showthread.php?p=11 055300 on Oct. 29, 2013.

You Don't Know Jack about Disks, Dave Anderson, Seagate Technologies, Queue—Storage Queue, vol. 1, issue 4, Jun. 2003, pp. 20-30 (11 pages).

Rosenblum, Mendel and Ousterhout, John K. (Feb. 1992), "The Design and Implementation of a Log-Structured File System." ACM Transactions on Computer Systems, vol. 10, Issue 1, pp. 26-52.

Rosenblum, "The Design and Implementation of a Log-structured File System", EECS Department, University of California, Berkeley, Technical Report No. UCB/CSD-92-696, Jun. 1992.

"Amer, et al., ""Design Issues for a Shingled Write Disk System"", 26th IEEE Symposium on Massive Storage Systems and Technologies: Research Track (MSST2010), May 2010, 12 pages".

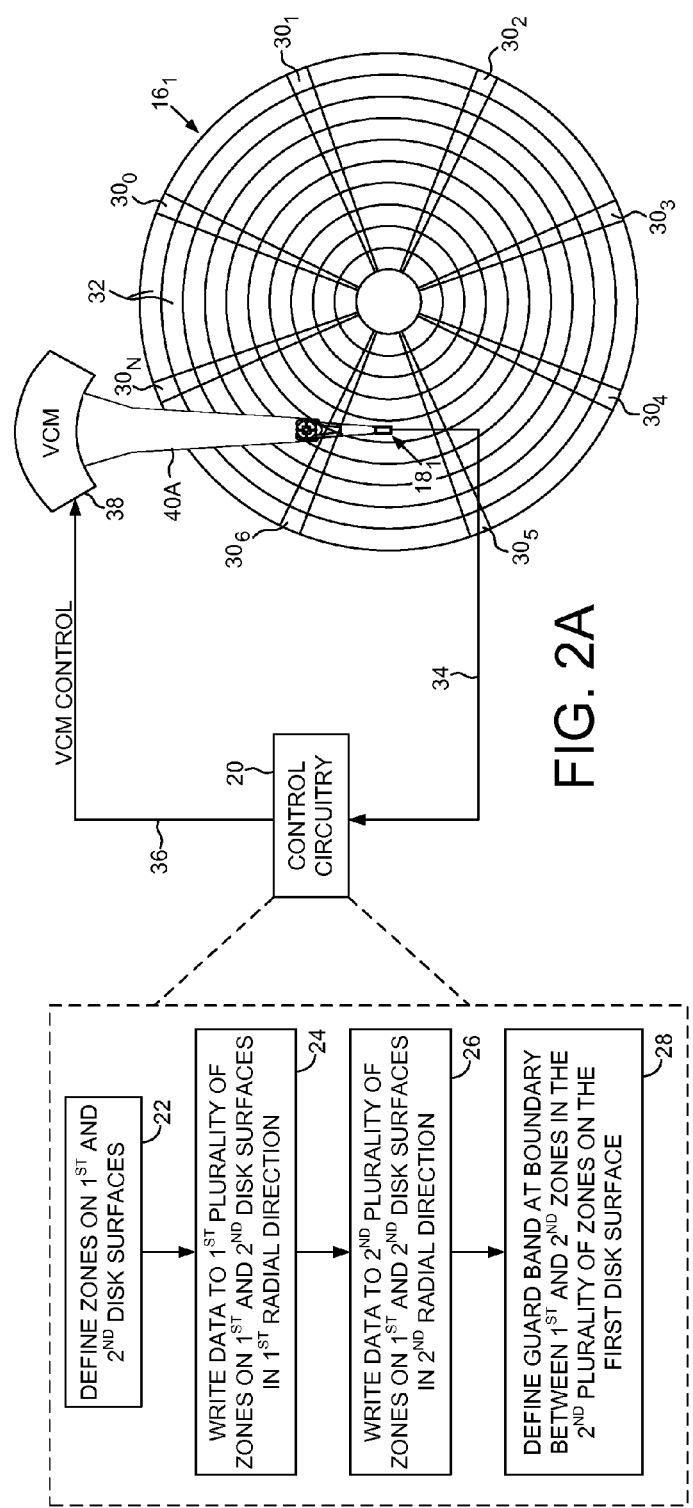
FIG. 2A
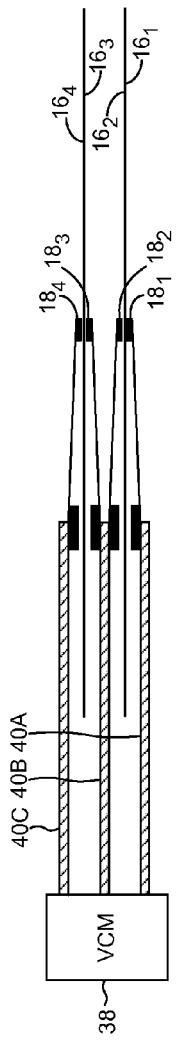
FIG. 2B
FIG. 2C

DISK DRIVE DEFINING GUARD BANDS TO SUPPORT ZONE SEQUENTIALITY WHEN BUTTERFLY WRITING SHINGLED DATA TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically grouped together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are grouped together in this example to form three physical zones from the inner diameter of the disk (ZONE 1) to the outer diameter of the disk (ZONE 3).

The prior art disk format of FIG. 1 also comprises a number of embedded servo sectors $6_0$-$6_N$ recorded around the circumference of the disk that define a plurality of servo tracks, wherein the data tracks 4 are defined relative to the servo tracks (at the same or different radial density). Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

The data sectors are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. Access commands (read/write) received from the host include LBAs which the disk drive maps to corresponding PBAs using any suitable mapping technique.

The LBA to PBA mapping may also facilitate log structured writes wherein at least part of the disk is written as a circular buffer. For example, the circular buffer may be written from an outer diameter track toward an inner diameter track, and then circle back to the outer diameter track. Data is written to the head of the circular buffer such that the LBAs of new write commands are mapped to the PBAs of the corresponding data sectors. When the same LBA is written by the host, the data is written to a new PBA at the head of the circular buffer and the old PBA is marked invalid so that it may be overwritten. During a garbage collection operation, valid PBAs previously written in the circular buffer may be relocated to the head of the circular buffer so that the old PBAs may be overwritten. In one embodiment, the tracks are written in a shingled manner such that a previously written track is partially overwritten, thereby increasing the overall capacity of the disk drive.

BRIEF DESCRIPTION OF THE DRAWINGS

FIGS. 2A and 2B show a disk drive according to an embodiment of the present invention comprising a plurality of disk surfaces and a plurality of corresponding heads.

FIG. 2C is a flow diagram according to an embodiment of the present invention wherein a guard band is defined on at least one disk surface to facilitate writing data in an interleaved, butterflied, and shingled manner.

DETAILED DESCRIPTION

Figure 1:
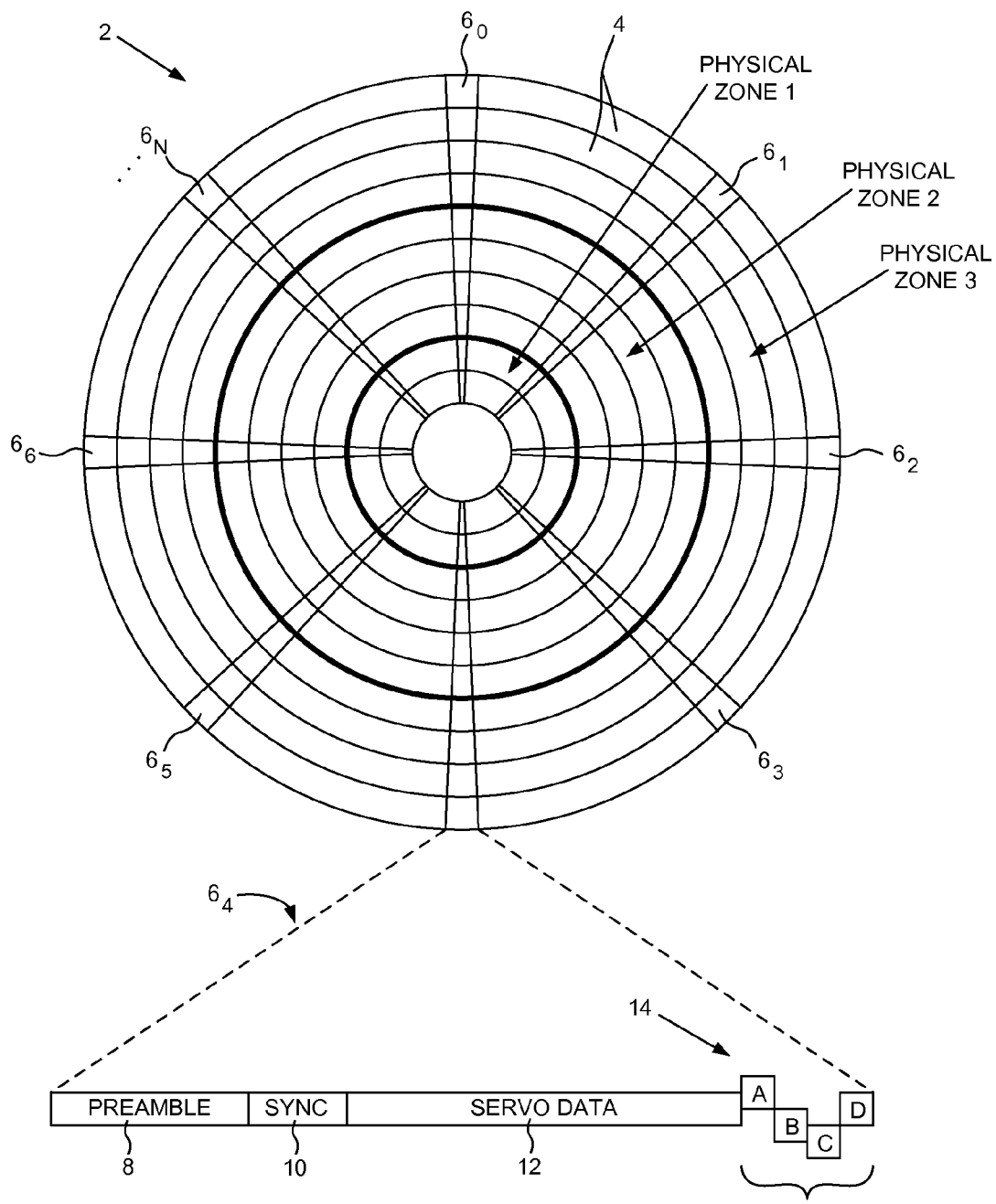
FIG. 1 shows a prior art disk format comprising a plurality of servo tracks defined by servo sectors.

FIGS. 2A and 2B show a disk drive according to an embodiment of the present invention comprising a first disk surface $16_1$ comprising a plurality of data tracks and a second disk surface $16_2$ comprising a plurality of data tracks. A first head $18_1$ is actuated over the first disk surface $16_1$ and a second $18_2$ head actuated over a second disk surface $16_2$. The disk drive further comprises control circuitry 20 operable to execute the flow diagram of FIG. 2C, wherein a plurality of zones on the first and second disk surfaces are defined (block 22), and each zone comprises a plurality of the data tracks. Data is written to the data tracks of a first plurality of the zones on the first and second disk surfaces in an interleaved manner and in a first radial direction, wherein the data tracks are written in a shingled manner (block 24). Data is written to the data tracks of a second plurality of the zones on the first and second disk surfaces in an interleaved manner and in a second radial direction opposite the first radial direction, wherein the data tracks are written in a shingled manner (block 26). At least one guard band is defined at a boundary between a first zone and a second zone in the second plurality of zones on the first disk surface, wherein the guard band comprises at least one unused data track (block 28).

In the embodiment of FIG. 2A, each disk surface (e.g., disk surface $16_1$) comprises embedded servo sectors $30_0$-$30_N$ that define a plurality of servo tracks 32, wherein a plurality of data tracks are defined relative to the servo tracks (at the same or different radial density). The control circuitry 20 processes a read signal 34 emanating from the head $18_1$ to demodulate the servo sectors $30_0$-$30_N$ and generate a position error signal (PES) representing an error between the actual position of the head and a target position relative to a target track. The control circuitry 20 filters the PES using a suitable compensation filter to generate a control signal 36 applied to a voice coil motor (VCM) 38 which rotates an actuator arm 40A about a pivot in order to actuate the head 18$_1$ radially over the disk surface 16$_1$ in a direction that reduces the PES. The servo sectors 30$_0$-30$_N$ may comprise any suitable position information, such as a track address for coarse positioning and servo bursts for fine positioning. The servo bursts may comprise any suitable servo burst pattern, such as an amplitude based servo burst pattern (e.g., A,B,C,D quadrature pattern shown in FIG. 1), or a phase based servo burst pattern (e.g., N,Q servo bursts).

Figure 3A:
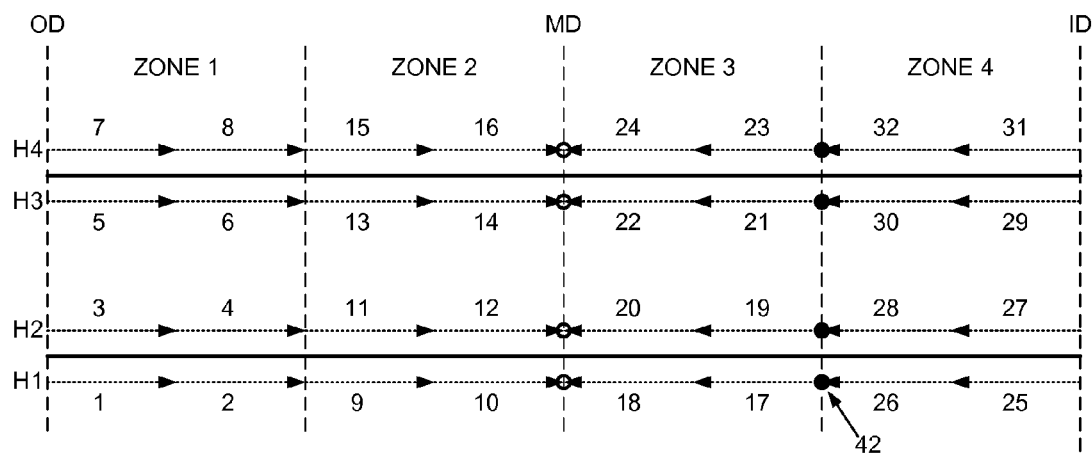
FIGS. 3A and 3B show an embodiment of the present invention wherein a guard band is defined between zones on at least one disk surface to facilitate writing data in an interleaved, butterflied, and shingled manner.

In one embodiment, the data tracks 32 on each disk surface are grouped together to form a plurality of zones. An example of this embodiment is shown in FIG. 3A wherein the disk drive comprises four disk surfaces (two disks) and the data tracks are grouped together on each disk surface to form a plurality of zones (ZONE 1 to ZONE 4 in the example of FIG. 3A). A first plurality of zones (e.g., ZONE 1 and ZONE 2) are located toward an outer diameter of the disk, and a second plurality of zones (e.g., ZONE 3 and ZONE 4) are located toward an inner diameter of the disk. In one embodiment, the data rate of each zone (linear bit density) is constant across a zone and different between zones (increasing toward the outer diameter of the disk surface). That is, in one embodiment the plurality of zones shown in FIG. 3A correspond to physical zones having predetermined data rates. In another embodiment, the data rate within at least one zone shown in FIG. 3A may vary such that the boundaries of the zones shown in FIG. 3A do not necessarily correspond to physical zone boundaries. In addition, in the embodiment of FIG. 3A the zone boundaries as shown as being aligned vertically across the disk surfaces; however, in other embodiments the zone boundaries may not be aligned vertically across the disk surfaces.

In FIG. 3A, the data tracks are written in an interleaved, butterflied, and shingled manner. That is, the sequence data is written follows the numbered order shown in FIG. 3A, starting with segment 1 on the first disk surface (using head 1 (H1)), then segment 2 on the first disk surface, then segment 3 on the second disk surface (using head 2 (H2)) and so on (where each segment comprises part of a zone). This pattern illustrates that the data is written over a first plurality of zones (including ZONE 1 and ZONE 2) in a first direction from the outer diameter (OD) toward the middle diameter (MD). After writing segment 16 on the fourth disk surface, the writing reverses direction by writing segment 17 on the first disk surface from an inner diameter (ID) of the disk toward the MD. This process of writing in a first direction (e.g., from OD toward MD) and then writing in the opposite direction (e.g., from ID toward MD) is referred to as writing in a butterfly pattern.

The segments in FIG. 3A may be written in any suitable order, such as by writing segment 1 on the fourth disk surface and sequencing down toward the first disk surface. In another embodiment, sequence of segments could be written starting from the ID toward the MD. That is, segment 1 may be written in place of segment 25 with the last segment being written in place of segment 8.

Figure 3B:
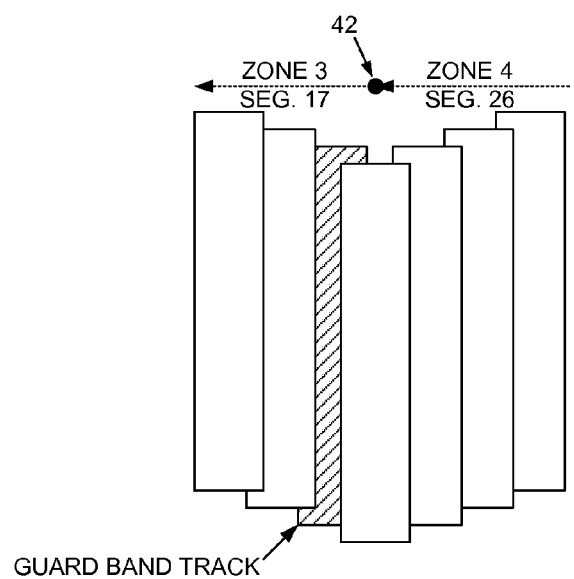

In the embodiments of the present invention, the data tracks are written in a shingled manner meaning that a previously written data track is at least partially overwritten when writing the next (adjacent) data track. After writing the last data track in segment 2 of FIG. 3A, that data track is at least partially overwritten when writing the first data track of segment 9. This does not present a problem since it is effectively the same as if the writing continued from segment 2 to segment 9 (instead of continuing to segment 3). However, when writing the shingled data tracks in the opposite direction a problem arises which is illustrated in FIG. 3B. After writing the first data track in segment 17 of FIG. 3A, that data track is at least partially overwritten when writing the second data track in segment 17. That same data track will also be overwritten when writing the last data track of segment 26 as illustrated in FIG. 3B. Accordingly, the first data track in segment 17 will be overwritten twice when writing the two adjacent data tracks which may render the first data track unrecoverable. Accordingly, in one embodiment in order to avoid this problem, a guard band 42 is defined between a first zone (e.g., ZONE 3) and a second zone (e.g., ZONE 4) in the second plurality of zones (throughout the figures, guard bands are denoted by solid dots). The guard band 42 comprises at least one unused data track, and in the example shown in FIG. 3B, the guard band 42 comprises the first data track in segment 17 of FIG. 3A which is overwritten by both adjacent data tracks as shown in FIG. 3B. That is, at least the data track that is overwritten by both adjacent data tracks is mapped out as unusable, thereby establishing the guard band.

FIG. 3A also illustrates an embodiment of the present invention wherein the control circuitry 20 is further operable to define a pivot point on the first disk surface at a boundary between a third zone (e.g., ZONE 2) in the first plurality of zones and a fourth zone (e.g., ZONE 3) in the second plurality of zones, wherein the pivot point corresponds to a substantially zero skew angle of the first head (throughout the figures, pivot points are denoted by hollow dots). The pivot point defines the boundary for the butterfly write operations; that is, the boundary where the writing direction reverses direction. In one embodiment, the pivot point is defined at a location where there is substantially zero skew angle of the head which helps reduce the inter-track interference due to the trailing edge of the write element during write operations. In addition, a pivot point may exhibit the same problem shown in FIG. 3B, and therefore in one embodiment a pivot point may also comprise a guard band that may be as wide or wider than a non-pivot point guard band (e.g., guard band 42 in FIG. 3A).

Figure 4:
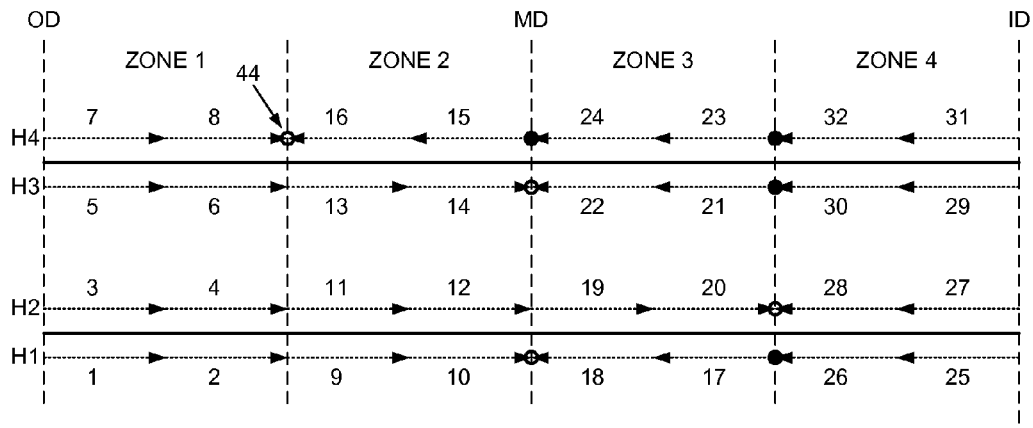
FIG. 4 shows an embodiment of the present invention wherein a pivot point may be defined on each disk surface which defines the boundary for writing data in a butterflied manner.

In the embodiment of FIG. 3A, the pivot points (and zero skew angle) for each disk surface are defined at the same radial location (at the MD). FIG. 4 shows an alternative embodiment wherein the pivot point (and zero skew angle) for each head may be defined at different radial locations for at least two of the disk surfaces. Any suitable technique may be employed to detect the zero skew angle for each head, such as by performing a write/read calibration that measures the width of the written track. The radial location that results in the narrowest written track corresponds to the zero skew angle for each head. In one embodiment, the radial location of zero skew angle may occur in the middle of a zone shown in FIG. 4 with a corresponding pivot point defined at that radial location. In another embodiment, the pivot point may be defined at the nearest zone boundary within the zone where the zero skew angle is detected. In the example shown in FIG. 4, the zero skew angle for the fourth head (H4) may be detected within segment 16 of ZONE 2, with the pivot point 44 being defined at the zone boundary between ZONE 1 and ZONE 2 of the fourth disk surface (i.e., between segments 8 and 16).

Figure 5:
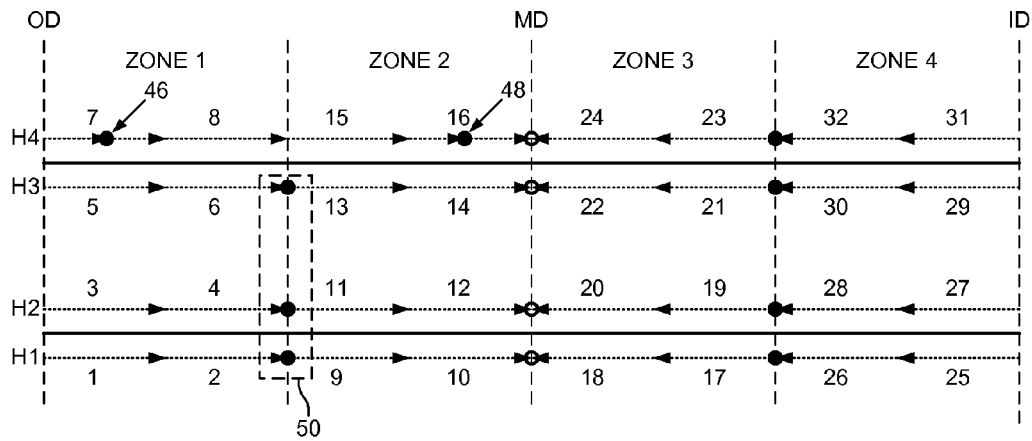
FIG. 5 shows an embodiment of the present invention wherein a plurality of logical capacity zones are defined across zones of first and second disk surfaces, and a guard band is defined at a boundary between two logical capacity zones.

FIG. 5 shows an embodiment of the present invention wherein a plurality of logical capacity zones are defined across the disk surfaces, wherein each logical capacity zone comprises a number of the data tracks. The size of each logical capacity zone may be configured dynamically after defining the recording format for the disk surfaces (after defining the segments, pivot points, etc.). Therefore, the boundary of each logical capacity zone may occur at any location within the zone segments shown in FIG. 5. In the example of FIG. 5, there are three logical capacity zones defined across the disk surfaces. The first logical capacity zone extends from the beginning of segment 1 to the middle of segment 7, the second logical capacity zone extends from the middle of segment 7 to the middle of segment 16, and the third logical capacity zone extends from the middle of segment 16 to the end of segment 32.

In one embodiment, the logical capacity zones shown in FIG. 5 may be written independent from one another. For example, the first data track in the second logical capacity zone (in the middle of segment 7) may be written first, and then the last track of the first logical capacity zone (in the middle of segment 7) may be written. Therefore in one embodiment, a guard band 46 is defined between the first and second logical capacity zones so that the first data track of the second logical capacity zone is not overwritten by both adjacent data tracks. That is, defining guard band 46 between the first and second logical capacity zones overcomes the same problem described above with reference to FIG. 3B. Similarly, a guard band 48 is defined between the second and third logical capacity zones (in the middle of segment 16). Also in the embodiment shown in FIG. 5, a number of guard bands 50 are defined between the boundary of ZONE 1 and ZONE 2 since this also defines a boundary between the first logical zone and the second logical zone. Again, the guard bands 50 are necessary to allow the logical capacity zones to be written in any desirable order.

In the above described embodiments, the figures show an example wherein the disk surfaces comprise four zones (ZONE 1 to ZONE 4). However, any suitable number of zones may be defined for the disk surfaces, wherein in some embodiments there may be tens, hundreds, or even thousands of zones defined across the disk surfaces. For example, in FIG. 4 the pivot point 44 for the fourth head (H4) is shown to be defined at a significant distance from the MD. However in an embodiment where there are a large number of zones defined across the disk surfaces, the pivot point 44 may be defined much closer to the MD (but still at any zone boundary away from the MD). In the embodiment shown in FIG. 4, the pivot point 44 is defined one zone boundary away from the MD, but in other embodiments the pivot point 44 may be defined at two or more zone boundaries away from the MD.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a first disk surface comprising a plurality of data tracks and a second disk surface comprising a plurality of data tracks;
    a first head actuated over the first disk surface and a second head actuated over the second disk surface; and
    control circuitry operable to:
        define a plurality of zones on the first and second disk surfaces, wherein each zone comprises a plurality of the data tracks;
        write data to the data tracks of a first plurality of the zones on the first and second disk surfaces in an interleaved manner and in a first radial direction, wherein the data tracks are written in a shingled manner;
        write data to the data tracks of a second plurality of the zones on the first and second disk surfaces in an interleaved manner and in a second radial direction opposite the first radial direction, wherein the data tracks are written in a shingled manner; and
        define at least one guard band at a boundary between a first zone and a second zone in the second plurality of zones on the first disk surface, wherein the guard band comprises at least one unused data track.

2. The disk drive as recited in claim 1, wherein the control circuitry is further operable to write the data to the first zone at a first data rate and write the data to the second zone at a second data rate lower than the first data rate.

3. The disk drive as recited in claim 2, wherein the first zone is located toward an outer diameter of the first disk surface and the second zone is located toward an inner diameter of the first disk surface.

4. The disk drive as recited in claim 1, wherein the control circuitry is further operable to define a first pivot point on the first disk surface at a boundary between a third zone in the first plurality of zones and a fourth zone in the second plurality of zones, wherein the first pivot point corresponds to a substantially zero skew angle of the first head.

5. The disk drive as recited in claim 4, wherein the control circuitry is further operable to write the data to the third zone at a first data rate and write the data to the fourth zone at a second data rate lower than the first data rate.

6. The disk drive as recited in claim 5, wherein the third zone is located toward an outer diameter of the first disk surface and the fourth zone is located toward an inner diameter of the first disk surface.

7. The disk drive as recited in claim 4, wherein the control circuitry is further operable to define a second pivot point on the second disk surface at a boundary between a fifth zone in the first plurality of zones and a sixth zone in the second plurality of zones, wherein:
    the second pivot point corresponds to a substantially zero skew angle of the second head; and
    the first pivot point is defined at a first radial location on the first disk surface and the second pivot point is defined at a second radial location the second disk surface, wherein the first radial location is different from the second radial location.

8. The disk drive as recited in claim 1, wherein the control circuitry is further operable to:
    define a first logical capacity zone comprising a first plurality of data tracks in the first plurality of zones on the first and second disk surfaces;

define a second logical capacity zone comprising a second plurality of data tracks in the first plurality of zones on the first and second disk surfaces; and define a guard band at a boundary between the first and second logical capacity zones, wherein the guard band comprises at least one unused data track.

9. The disk drive as recited in claim 1, wherein the data tracks of at least one of the zones are written in a non-shingled manner.

10. A method of operating a disk drive comprising a first disk surface comprising a plurality of data tracks and a second disk surface comprising a plurality of data tracks, and a first head actuated over the first disk surface and a second head actuated over the second disk surface, the method comprising:

defining a plurality of zones on the first and second disk surfaces, wherein each zone comprises a plurality of the data tracks;

writing data to the data tracks of a first plurality of the zones on the first and second disk surfaces in an interleaved manner and in a first radial direction, wherein the data tracks are written in a shingled manner;

writing data to the data tracks of a second plurality of the zones on the first and second disk surfaces in an interleaved manner and in a second radial direction opposite the first radial direction, wherein the data tracks are written in a shingled manner; and defining at least one guard band at a boundary between a first zone and a second zone in the second plurality of zones on the first disk surface, wherein the guard band comprises at least one unused data track.

11. The method as recited in claim 10, further comprising writing the data to the first zone at a first data rate and writing the data to the second zone at a second data rate lower than the first data rate.

12. The method as recited in claim 11, wherein the first zone is located toward an outer diameter of the first disk surface and the second zone is located toward an inner diameter of the first disk surface.

13. The method as recited in claim 10, further comprising defining a first pivot point on the first disk surface at a boundary between a third zone in the first plurality of zones and a fourth zone in the second plurality of zones, wherein the first pivot point corresponds to a substantially zero skew angle of the first head.

14. The method as recited in claim 13, further comprising writing the data to the third zone at a first data rate and write the data to the fourth zone at a second data rate lower than the first data rate.

15. The method as recited in claim 14, wherein the third zone is located toward an outer diameter of the first disk surface and the fourth zone is located toward an inner diameter of the first disk surface.

16. The method as recited in claim 13, further comprising defining a second pivot point on the second disk surface at a boundary between a fifth zone in the first plurality of zones and a sixth zone in the second plurality of zones, wherein:

the second pivot point corresponds to a substantially zero skew angle of the second head; and the first pivot point is defined at a first radial location on the first disk surface and the second pivot point is defined at a second radial location the second disk surface, wherein the first radial location is different from the second radial location.

17. The method as recited in claim 10, further comprising:

defining a first logical capacity zone comprising a first plurality of data tracks in the first plurality of zones on the first and second disk surfaces;

defining a second logical capacity zone comprising a second plurality of data tracks in the first plurality of zones on the first and second disk surfaces; and defining a guard band at a boundary between the first and second logical capacity zones, wherein the guard band comprises at least one unused data track.

18. The method as recited in claim 10, wherein the data tracks of at least one of the zones are written in a non-shingled manner.

* * * * *